(12) United States Patent
Buchmann

(10) Patent No.: US 10,289,622 B2
(45) Date of Patent: May 14, 2019

(54) RANKING USING DATA OF CONTINUOUS SCALES

(71) Applicant: SAP SE, Walldorf (DE)

(72) Inventor: Daniel Buchmann, Karlsruhe (DE)

(73) Assignee: SAP SE, Walldorf (DE)

( * ) Notice: Subject to any disclaimer, the term of this patent is extended or adjusted under 35 U.S.C. 154(b) by 683 days.

(21) Appl. No.: 14/951,296

(22) Filed: Nov. 24, 2015

(65) Prior Publication Data

US 2017/0147583 A1 May 25, 2017

(51) Int. Cl.
  *G06F 16/00* (2019.01)
  *G06F 16/2457* (2019.01)

(52) U.S. Cl.
  CPC .............. *G06F 16/24578* (2019.01)

(58) Field of Classification Search
  CPC ........... G06F 17/3053; G06F 17/30477; G06F 16/24578
  USPC ......................................................... 707/723
  See application file for complete search history.

(56) References Cited

U.S. PATENT DOCUMENTS

| | | | | |
|---|---|---|---|---|
| 8,898,175 B2* | 11/2014 | Zenger | .............. | G06F 17/30445 707/748 |
| 2008/0016053 A1 | 1/2008 | Frieden et al. | | |
| 2013/0173605 A1* | 7/2013 | Dou | .................. | G06F 17/30705 707/723 |
| 2015/0234827 A1* | 8/2015 | Lin | ...................... | G06F 17/3053 707/729 |
| 2016/0323398 A1* | 11/2016 | Guo | ................. | G06Q 10/06311 |
| 2017/0147580 A1 | 5/2017 | Buchmann et al. | | |
| 2017/0147582 A1 | 5/2017 | Michels et al. | | |
| 2017/0147584 A1 | 5/2017 | Buchmann | | |

OTHER PUBLICATIONS

Xin et al., "Answering Top-k Queries with Multi-Dimensional Selections: The Ranking Cube Approach"; VLDB '06, Sep. 12-15, 2006; 12 pages.*
"U.S. Appl. No. 14/951,278, Examiner Interview Summary dated Sep. 25, 2018", 3 pgs.

(Continued)

*Primary Examiner* — Monica M Pyo
(74) *Attorney, Agent, or Firm* — Schwegman Lundberg & Woessner, P.A.

(57) ABSTRACT

Methods, systems, and computer program products for ranking data items are described. A ranking configuration is defined for an object type, the ranking configuration comprising an assignment of one or more ranking dimensions to the object type and, for each of the one or more assigned ranking dimensions, one or more corresponding values and a significance weight assigned to each value. Each ranking dimension comprises one or more object attributes and a ranking-impact weight, at least one of the object attributes being a continuous-scales object attribute. A ranking condition is generated for each ranking dimension assigned to the object type. The generation of the ranking condition is based at least in part on the one or more object attributes, a specified ranking-impact weight, the one or more values and associated significance weights, and a distance function corresponding to the continuous-scales object attribute. A database query for data objects of the object type and comprising the generated ranking condition is generated.

19 Claims, 10 Drawing Sheets

(56) References Cited

OTHER PUBLICATIONS

"U.S. Appl. No. 14/951,278, Non Final Office Action dated Jun. 27, 2018", 10 pgs.
"U.S. Appl. No. 14/951,278, Response filed Sep. 13, 2018 to Non Final Office Action dated Jun. 27, 2018", 17 pgs.
"U.S. Appl. No. 14/951,291, Examiner Interview Summary dated Aug. 7, 2018", 3 pgs.
"U.S. Appl. No. 14/951,291, Non Final Office Action dated Jun. 27, 2018", 23 pgs.
"U.S. Appl. No. 14/951,291, Response filed Aug. 22, 2018 to Non Final Office Action dated Jun. 27, 2018", 17 pgs.
"U.S. Appl. No. 14/951,315, Non Final Office Action dated Jun. 28, 2018", 10 pgs.
"U.S. Appl. No. 14/951,315, Response filed Sep. 28, 2018 to Non Final Office Action dated Jun. 28, 2018", 13 pgs.
"Ranking Your Results: using Rank, Dense Rank and Row-Number", [Online] Retrieved from the internet: <http://moinne.com/blog/ronald/oracle/ranking-your-results-using-rank-dense_rank-and-row_number>, (Jun. 3, 2010), 7 pgs.

* cited by examiner

| | 814 | 816 | 818 | 820 | 822 | 824 |
|---|---|---|---|---|---|---|
| | Location | Employee | Work Area | ObjectID | Product | Amount |
| | TX | User A | Purchases | 4 | Potatotes | $275 |
| | TX | User A | Sales | 4 | Grass | $100 |
| | MN | User A | Purchases | 5 | Grass | $55 |
| | NE | User A | Sales | 5 | Potatoes | $275 |
| | NE | User B | Purchases | 6 | Apples | $54 |
| | France | User C | Contracts | 88 | Tulips | $55 |
| | MN | User A | Contracts | 99 | Grass | $275 |
| | MI | User A | Sales | 217 | Apples | $275 |
| | MI | User A | Purchases | 217 | Tulips | $55 |
| | MN | User A | Sales | 317 | Tulips | $54 |
| | France | User A | Purchases | 317 | Apples | $54 |

FIG. 8A

| 814 | 816 | 818 | 820 | 822 | 824 |
|---|---|---|---|---|---|
| Location | Employee | Work Area | ObjectID | Product | Amount |
| MI | User A | Sales | 217 | Apples | $275 |
| MN | User A | Sales | 317 | Tulips | $54 |
| TX | User A | Sales | 4 | Grass | $100 |
| NE | User A | Sales | 5 | Potatoes | $275 |
| France | User A | Purchases | 317 | Apples | $54 |
| MI | User A | Purchases | 217 | Tulips | $55 |
| MN | User A | Purchases | 5 | Grass | $55 |
| TX | User A | Purchases | 4 | Potatoes | $275 |
| NE | User B | Purchases | 6 | Apples | $54 |
| France | User C | Contracts | 88 | Tulips | $55 |
| MN | User A | Contracts | 99 | Grass | $275 |

FIG. 8B

RANKING USING DATA OF CONTINUOUS SCALES

CROSS-REFERENCE TO RELATED APPLICATIONS

The present application is related to U.S. patent application Ser. No. 14/951,291 entitled "Ranking based on Object Data," U.S. patent application Ser. No. 14/951,278 entitled "User-dependent Ranking of Data items," and U.S. patent application Ser. No. 14/951,315 entitled "Ranking based on Dynamic Contextual Information," all filed on even date herewith. The disclosures of these three related applications are incorporated herein by reference in their entireties.

FIELD

The present disclosure relates generally to a mechanism for ranking data items. In an example embodiment, the disclosure relates to a mechanism for ranking data items of continuous scales in a search result list.

BACKGROUND

Ranking data items is an important task of many applications, especially in scenarios where the number of data items being processed is large. Ranking may be used to organize a predefined set of data items, such as ranking a list of automobiles manufactured in the United States according to cost or reliability, or to organize a dynamic set of data items, such as ranking the items of a search result set. For example, searching for clothes available online for sale often returns an unmanageably large set of articles. Ranking the items by, for example, relevance to a user's search query can be as important as identifying the items based on the search terms.

BRIEF DESCRIPTION OF DRAWINGS

The present disclosure is illustrated by way of example and not limitation in the figures of the accompanying drawings, in which like references indicate similar elements and in which:

FIGS. 8A and 8B illustrate unranked and ranked example query results, in accordance with an example embodiment;

DETAILED DESCRIPTION

Figure 1A:
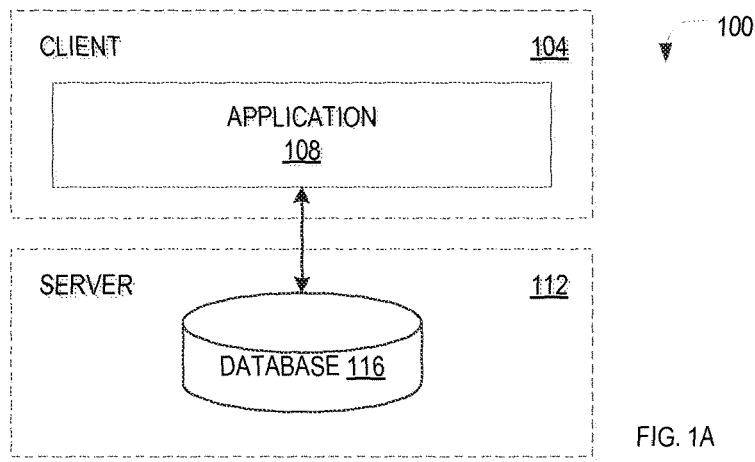
FIGS. 1A and 1B are schematic diagrams of example systems, in accordance with example embodiments, for ranking data items, such as items in a search result set.

The description that follows includes illustrative systems, methods, techniques, instruction sequences, and computing program products that embody example embodiments of the present invention. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

Generally, methods, systems, apparatus, and computer program products for performing ranking of data items are described. In various example embodiments, the data items include structured data in the form of data objects each including one or more object attributes, e.g., as are commonly stored in a database as database records, and the ranking is based at least in part on the object data itself. For instance, in one example embodiment, a ranking configuration specifies values of object attributes that cause a data object to be ranked higher than others. Considering, as an application example, product data used in a procurement application, data objects corresponding to products with lower prices, or products offered by a specified preferred vendor, may be ranked higher. In accordance with some embodiments, ranking based on the object data can be seamlessly combined with ranking based on other criteria. For example, in a search result list responsive to one or more (e.g., user-supplied) search terms, data objects may be ranked based on a combination of their relevancy to the search term(s) (e.g., matches between the object attributes and the search terms) and one or more boosting conditions that apply to the object attributes themselves. To illustrate by way of example, when ranking data objects retrieved, in response to a search request by a particular user, from a database shared by many users, data objects associated with the particular user in regard to one or more object attributes (e.g., an attribute specifying who created or last modified the data object) may be boosted, that is, increased in rank, in the search result list.

In one example embodiment, a parameter or attribute can be either discrete or continuous. A user identification attribute, for example, is discrete: it is either the session user or another user. A geographic location parameter may be a continuous parameter. For example, an area defined by a circumference around a target value may be considered by the search/ranking procedure, where the ranking value (ceteris paribus) declines with increasing radius. The target value may be static (e.g., Nov. 1, 2015 (ceteris paribus)) or dynamic (e.g., "the latest news ranks highest" (ceteris paribus)). Formally, a distance function is defined that calculates the distance between the actual value and a (potentially dynamic) target value, and maps this to a ranking parameter and/or attribute. In one example embodiment, the distance functions may be implemented using distance functions defined for fuzzy searches, as described more fully below.

In one example embodiment, dynamic contextual information is used to influence the ranking of the data items. The current location of a user, the application context the user is working in, or even the current outdoor temperature are examples of dynamic contextual information that can be used in ranking data items, such as data items in a search result set. For example, a search for clothing articles may return sandals and bathing suits as well as parkas and winter gloves. The rank of parkas and winter gloves can be boosted in a product result set when the current temperature is cold, and the rank of sandals and bathing suits can be boosted in a product result set when the current temperature is warm. Dynamic context-based ranking is distinguished from static context-based ranking by the determination of the contextual data values after the configuration of the contextual ranking criteria.

The disclosed methods, systems, apparatus, and computer program products may be universally applicable independent of application, data source, and data type. For example, predefined sets of data items, data items in a search result set, ad hoc lists of data items, and the like may be ranked. In addition, the data items may reside as data objects in a database, text in a file, data in a spreadsheet, information on a web site, and the like. The data items may also be ranked as they are dynamically created. While the following description focuses on the ranking of data objects in a database, which are inherently structured, it will be appreciated that data stored in other forms (e.g., in flat files) may likewise be amenable to the ranking approach described herein. Data stored in text files, for instance, may be explicitly structured with tags of a suitable markup language (e.g., HyperText Markup Language (HTML)), or structurable by parsing, to ascertain the equivalent of object attributes as stored in database records.

Figure 1B:
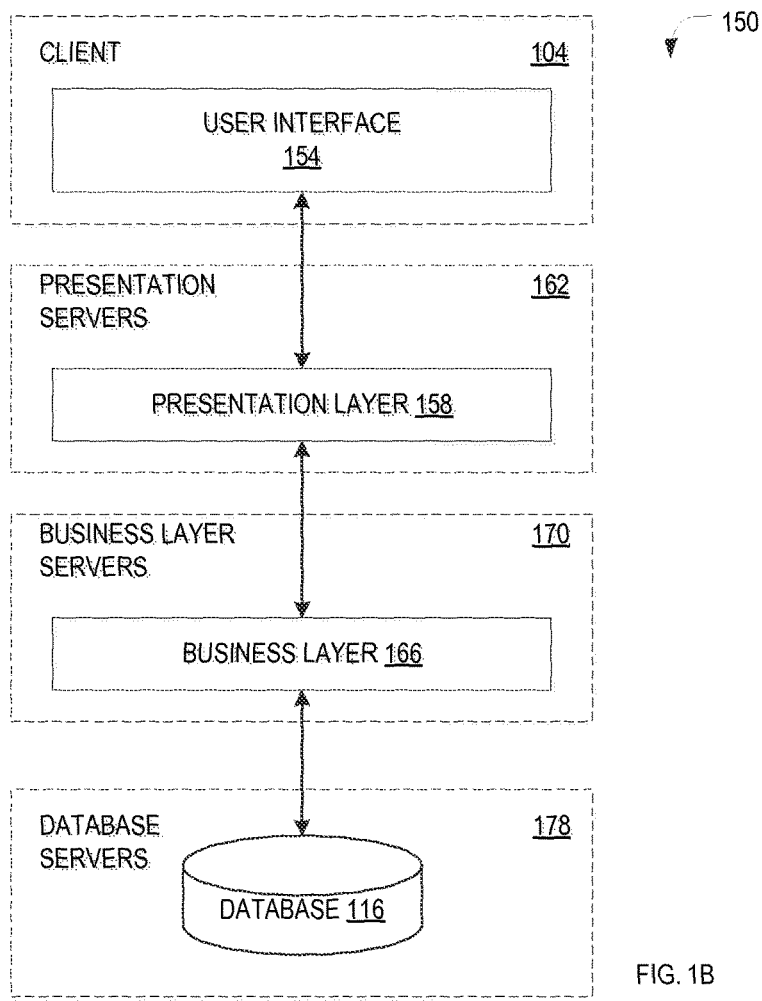

FIGS. 1A and 1B illustrate schematic diagrams of example systems 100, 150, in accordance with example embodiments, for ranking data items, such as items in a search result set. Traditional client-server systems may employ a two-tiered architecture such as that illustrated by the system 100 in FIG. 1A. An application 108 executed on a client device 104 of the two-tiered architecture may be composed of a monolithic set of program code including a graphical user interface component, presentation logic, business logic, and a network interface that enables the client device 104 to communicate over a network with one or more servers 112. A database 116 may be maintained on the server 112 that provides non-volatile or "persistent" storage for the data accessed and/or processed by the application 108. Data items, such as data objects, may be retrieved from the database 116, e.g., in response to a search query submitted via the application 108. In one example embodiment, the data items in the search result set are ranked, as described more fully below.

The "business logic" component of the application 108 may represent the core program code of the application 108, i.e., the rules governing the underlying business process (or other functionality) provided by the application 108. The "presentation logic" may describe the specific manner in which the results of the business logic are formatted for display on the user interface. The server 112 may include, in association with the database 116, a DBMS (not shown) including data access logic used by the business logic to store and retrieve data.

In response to limitations associated with the two-tiered client-server architecture, a multi-tiered architecture has been developed, as illustrated in FIG. 1B. In the system 150, a presentation layer 158, a business layer 166, and the database 116 may be logically separated from a user interface 154 of the client device 104. These layers may be moved off of the client device 104 to one or more dedicated servers on the network. For example, the presentation layer 158, the business layer 166, and the database 116 may each be maintained on separate servers (e.g., presentation servers 162, business layer servers 170, and database servers 178).

This separation of logical components from the user interface 154 may provide a more flexible and scalable architecture compared to that provided by the two-tiered model of the system 100 in FIG. 1A. For example, the separation may ensure that all clients share a single implementation of the business layer 166. If business rules change, changing the current implementation of the business layer 166 to a new version may not call for updating any client-side program code. In addition, the presentation layer 158 may be provided, which generates code for a variety of different user interfaces 154, which may be standard browsers.

Figure 2:
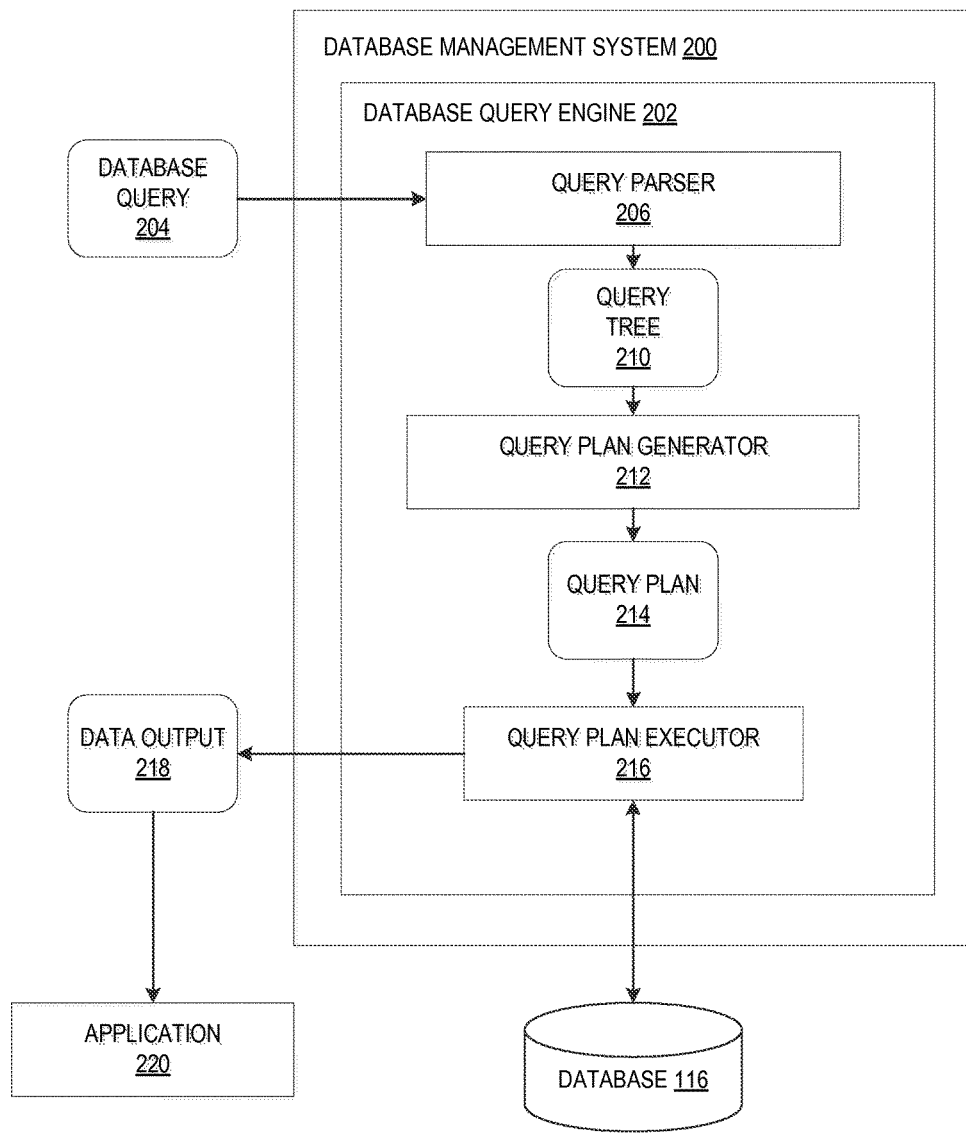
FIG. 2 is a block diagram illustrating the functioning of an example database management system (DBMS) for performing a query on a database and ranking the query results, in accordance with an example embodiment.

FIG. 2 is a block diagram illustrating the functioning of an example database management system (DBMS) 200 for performing a query on a database 116 and ranking the query results, in accordance with an example embodiment. The DBMS 200 also enforces user authentication and authorization.

The DBMS 200 may be implemented along with the database 116 on the servers 112 or 178 of FIGS. 1A and 1B. From the perspective of the DBMS 200, an application accessing the database 116, whether this be, e.g., an application 108 running on a client device 104 in a two-tiered architecture or an application in the business layer 166 of a multi-tiered architecture, is considered a client. Accordingly, hereinafter, such an application will be considered client-side and generally referred to as a "database-accessing service module."

Figure 3:
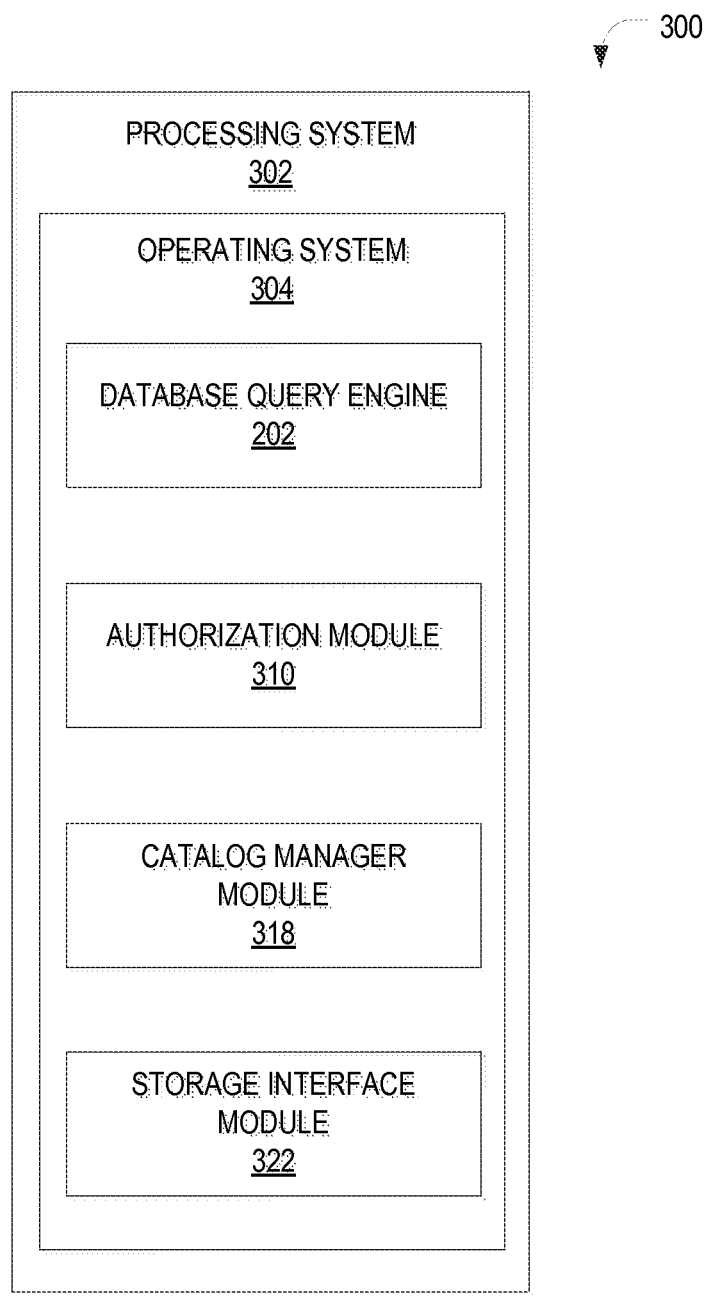
FIG. 3 is a block diagram of an example apparatus for executing queries and ranking data items, such as items in a search result set, based in part on object data, in accordance with an example embodiment.

The DBMS 200 may include multiple modules, illustrated in more detail in FIG. 3, for providing functionality for, e.g., managing database schemata, facilitating read and/or write access to the database 116 by client applications, and/or enforcing user authentication and authorization policies. In an example embodiment, the same user can be authorized to access and/or execute database entities, such as tables, procedures, views, and the like. The DBMS 200 may also maintain information regarding the searching and ranking processes. For example, the DBMS 200 may maintain information indicating whether a ranking process is running or is stopped. As illustrated, the DBMS 200 includes a database query engine 202 that can receive and process database queries 204 (illustrated in FIG. 2, like other types of data passed between the system components, with rounded rectangles). The database query engine 202 may, for instance, be a Structured Query Language (SQL) engine that can process SQL statements such as SELECT statements, as are commonly used to retrieve data objects from databases. While the present disclosure relates, in particular, to read-access to the database 116 (i.e., queries for retrieving data objects), an SQL engine generally also allows processing statements for writing to the database by inserting new or modifying existing data objects.

The database query engine 202 may include a query parser 206 to create a parsed query from the incoming database query 204, and further to decompose the parsed query into a network of operators, with each operator representing an atomic processing block. The parsed query may then be represented as a directed, acyclic graph (DAG), or "query tree" 210. The query tree 210 is passed to a query plan generator 212, which can generate a query plan 214 by analyzing possible combinations of operations to execute the query and selecting an efficient one. The resulting query plan 214 may be converted into code and forwarded to a query plan executor 216 for execution. The query plan executor 216 can then utilize the converted query plan 214 to obtain appropriate data responsive to the database query 204 from the database 116. Data output 218 from the database 116 can be returned to the requesting application or resource 220 (or some other specified destination), which may be, e.g., an operational applications spreadsheet or visualization application, or reporting/business intelligence tools.

FIG. 3 is a block diagram of an example apparatus 300 for executing queries and ranking data items, such as data items in a search result set, in accordance with an example embodiment. The DBMS 200 of FIG. 2 may implemented, e.g., using the apparatus 300. The apparatus 300 is shown to include a processing system 302 that may be implemented on a server, client, or other processing device that includes an operating system 304 for executing software instructions. The operating system 304 running on the processing system 302 facilitates executing software instructions by mediating between multiple higher-level program modules and hardware components. In accordance with an example embodiment, the apparatus 300 may include the database query engine 202, an authorization module 310, a catalog manager module 318, and a storage interface module 322.

The database query engine 202 may issue an authorization check to the authorization module 310 in order to confirm that the user is authorized to perform, for example, the requested search and ranking tasks. The authorization module 310, upon checking whether a user is authorized to request a particular action, issues authorization messages to other entities, such as the database query engine 202.

The database query engine 202 may include an SQL parser module (not shown) that is responsible for parsing SQL statements received by the DBMS 200 and creating a statement tree. The SQL parser module may issue an authorization check to the authorization module 310 in order to confirm that the user is authorized to perform, for example, the requested search and ranking tasks.

The authorization module 310 checks whether a user is authorized to request a particular action and issues authorization messages to other entities, such as the SQL parser module. For example, the authorization module 310 may check whether a user is authorized to issue an SQL statement received by the SQL parser module.

The database query engine 202 may also include a query processing module (not shown) that is responsible for processing queries issued to the DBMS 200. For example, the query processing module may process an SQL statement received by the DBMS 200. The query processing module may also create catalog entries in one or more catalogs of the DBMS 200. The catalog manager module 318 may be responsible for managing and providing access to the catalog(s) of the DBMS 200, including managing database schemata and metadata. The storage interface module 322 provides access to various storage elements, such as the column stores and catalog(s) of the DBMS 200.

Figure 4:
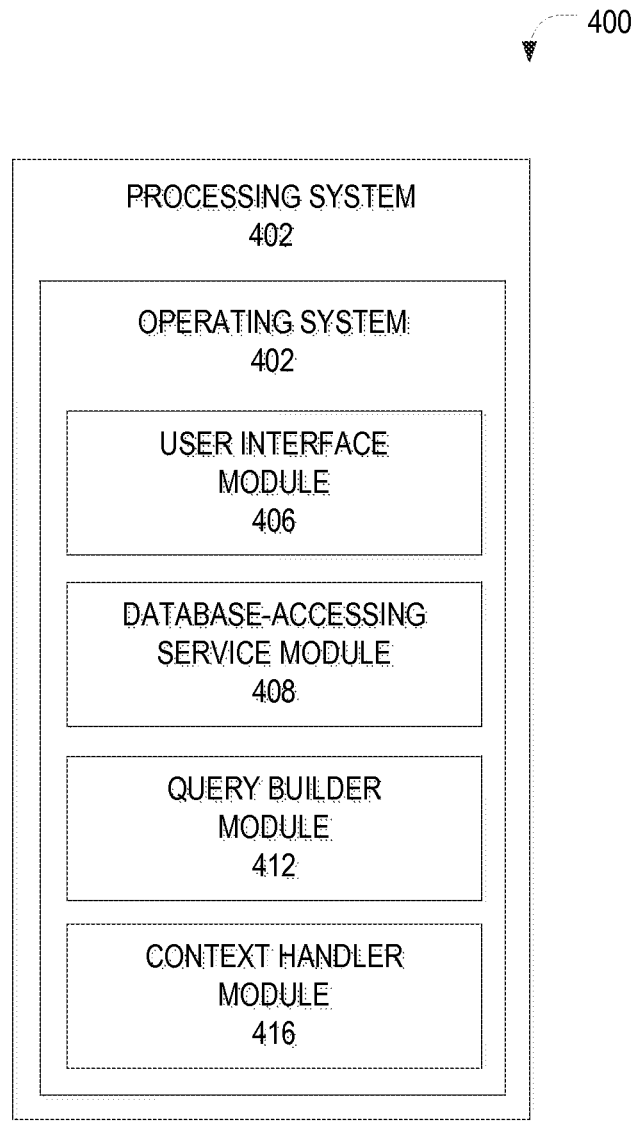
FIG. 4 is a block diagram of an example apparatus for generating a search query, in accordance with an example embodiment.

FIG. 4 is a block diagram of an example apparatus 400 for generating a search query, such as the database query 204, in accordance with an example embodiment. The apparatus 400 is shown to include a processing system 402 that may be implemented on a server, client, or other processing device that includes an operating system 404 for executing software instructions. The processing system 402 may be implemented, e.g., on the client device 104 of FIG. 1A (or in parts on the client device 104) and on the presentation and business layer servers 162, 170 of FIG. 1B. In accordance with an example embodiment, the apparatus 400 may include a user interface module 406, a database-accessing service module 408, a query builder module 412, and an optional context handler module 416.

The user interface module 406 provides an interface for a user to initiate a query and a ranking of data items. In one example embodiment, the user interface module 406 enables a user to initiate a search of data objects in the database 116, as described more fully below by way of example in conjunction with FIG. 7. The user may explicitly search for certain data by entering one or more search terms and/or other search criteria (e.g., an object type of interest).

The database-accessing service module 408 may be an application programming interface (API) that receives user input as a search request and forwards it to the query builder module 412 to cause a database query 204 to be generated and executed in order to service the search request. In another embodiment, the database-accessing service module 408 is an application that automatically initiates a database access, e.g., to populate data fields in a user interface upon log-in of a user, or to retrieve data used to process a request for service from another application in a services-oriented architecture.

The query builder module 412 generates, based on a database-access request, a database query 204 in a query language understood by the database query engine 202. The query language may, for example, be SQL, which facilitates data retrieval from a database via SELECT statements.

The optional context handler module 416 obtains the value(s) of dynamic contextual parameters and dynamic contextual attributes, and maps the value(s) to the corresponding parameter or attribute such that the ranking is based on the current value of the parameter or attribute, as described more fully below in the section entitled "Ranking Based on Dynamic Contextual Information." As used herein, an attribute refers to a characteristic (or attribute) of a data item, and a dynamic contextual parameter refers to other information, such as the current outdoor temperature. In the embodiment disclosed below, an attribute is stored in a table of the database 116. The source of the actual value of the parameter or attribute can be a server (for values such as user settings, date, time, and the like), a client device (for values such as device identification, application identification, location, user heart rate, and the like), and the like.

Figure 5:
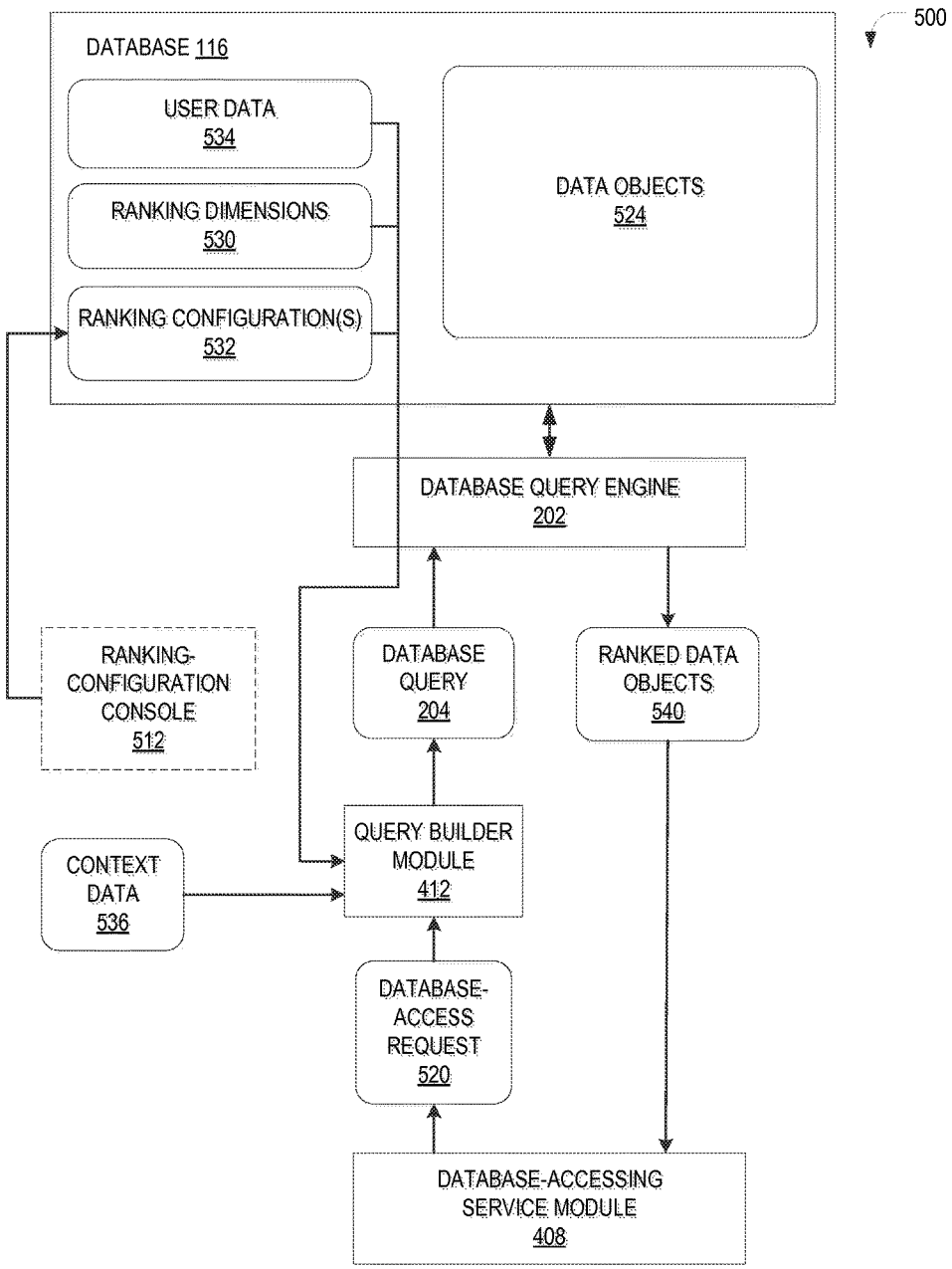
FIG. 5 is a data flow diagram of an example system for ranking data objects retrieved from a database, in accordance with one example embodiment.

FIG. 5 is a data flow diagram for an example system 500 for ranking data objects retrieved from the database 116, in accordance with various embodiments, illustrating the data (depicted with rounded rectangles) flowing between the various system components (depicted with sharp rectangles). The system 500 includes, in addition to the database 116, a plurality of functional modules, such as the query builder module 412, the database query engine 202, the database-accessing service module 408, and a ranking-configuration console 512; these modules may be implemented, for example, as software modules executing on one or more computing devices such as the client device 104, the apparatus 300, the apparatus 400, and the servers 112, 162, 170, 178 of FIGS. 1A, 1B, and 2-4. The query builder module 412 as well as the ranking-configuration console 512 may each be implemented server-side or client-side (depending, e.g., on application details as explained below). The query builder module 412 mediates between the database-accessing service module 408 and the database query engine 202 by converting a database-access request 520 from the database-accessing service module 408 into the database query 204 suitable for execution by the database query engine 202. The query builder module 412 may be implemented as an integral part of the database-accessing service module 408 or, alternatively, as a separate module in communication with the database-accessing service module 408 (or with multiple database-accessing services modules 408), as illustrated in FIG. 4.

The database 116 stores a plurality (usually a large number) of data objects 524 of, generally, various types. For example, a database for a business may store data for different types of business objects representing different respective types of business entities, such as employees, departments, projects, products, transactions, materials, suppliers, cost and expense items, and the like. This data may be organized in multiple tables corresponding to the different respective object types. Within a given table, each data record, or row, corresponds to an individual data object, and generally includes a key uniquely identifying the data object as well as one or more data object attributes. For instance, in a table storing employee data, the first column may store a unique identification number for each employee, and further columns may store the employee's name, job title, date of hire, office location, email address, telephone number, and/or any other employee-specific data of interest. Since the key and object attributes are functionally equivalent for purposes of filtering and/or ranking data objects in accordance herewith, the terms "object attribute" and "attribute" are hereinafter meant to include non-key attributes and key attributes, unless otherwise noted or apparent from context. Also, for purposes of this disclosure, the term "table" is intended to include not only the persistent base tables created in accordance with the physical schema underlying the database, but also virtual tables corresponding to views (as the term is understood in the art) created by joining data from multiple base tables. Furthermore, each base table itself may include an anchor table representing a particular object type and one or more additional tables, included by way of joining, that hold attributes related to various aspects of the object type.

Data retrieval from the database 116 may be triggered manually or automatically under various circumstances, depending on the kind of database-accessing service module 408. For example, in accordance with one example embodiment, a user may explicitly search for certain data by entering one or more search terms and/or other search criteria (e.g., an object type of interest) via a suitable search user interface, such as a user interface provided by the user interface module 406. In this case, the database-accessing service module 408 may be an API that receives the user input as a search request and forwards it to the query builder module 412 to cause a database query 204 to be generated and executed to service the search request. In another embodiment, the database-accessing service module 408 is an application that automatically initiates a database access, e.g., to populate data fields in a user interface, or to retrieve data used to process a request for service from another application in a services-oriented architecture. User-initiated search requests and internally program-created data requests are both examples of "database-access requests," as the term is used herein.

The query builder module 412 generates, based on the database-access request 520, the database query 204 in a query language understood by the database query engine 202. The query language may, for example, be SQL, which facilitates data retrieval from a database via SELECT statements. The database query 204 may specify, as the source of the data, one or more of the tables in the database 116, corresponding to one or more object types specified in the database-access request 520. In case of a search request from a user, for example, the object type(s) may be indicated explicitly as search criteria, or inferred from the search terms. If the database-access request 520 does not specify any object types, a default rule may cause all tables to be searched or a defined subset of the tables to be searched. The data objects within the specified tables can be filtered based on various conditions included in the query (e.g., implemented as WHERE conditions in a SELECT statement). For example, a database query 204 generated based on a search request including a search term may include a condition that the retrieved data objects include the search term in any of their object attributes.

In addition, in accordance with various embodiments, the database query 204 may include conditions for ranking the data objects based on the parameters and object attributes themselves (including independently of any search terms). The ranking conditions may be created by the query builder module 412 based on stored ranking dimensions 530 and ranking configurations 532, optionally in conjunction with other data, such as user data 534 or context data 536. The ranking configurations 532 may be created manually, e.g., via the ranking-configuration console 512, or programmatically. The ranking dimensions 530, ranking configurations 532, and user data 534 may be stored in the database 116, as shown. Alternatively, they may be stored in whole or in part in one or more separate data repositories. In either case, they are stored in a manner directly or indirectly accessible by the query builder module 412. In further example embodiments, the ranking dimensions 530, ranking configuration 532, and/or user data 534 are stored client-side and selectively passed to the query builder module 412 along with the database-access request 520. The context data 536 reflects various parameters measured subsequent to creation of the ranking configuration, e.g., at the time the database-access request 520 is issued. Example parameters include the user's current geographic location or the time of day. Accordingly, the context data 536 is supplied to the query builder module 412 at runtime. The context data 536 may originate server-side or client-side.

Database queries 204 generated by the query builder module 412 can be executed by the database query engine 202. The database query engine 202 may be, e.g., a suitable commercially available query engine (e.g., an SQL engine), or a customized enhancement thereof, and may be provided as part of a database management system associated with the database 116 (e.g., DBMS 200). The database query engine 202 may have inherent functionality not only for retrieving data objects in accordance with a SELECT statement, but also for ranking them in accordance with suitably formatted, weighted WHERE conditions (as explained in more detail below). Following execution of the database query 204, the database query engine 202 returns ranked data objects 540 to, for example, the database-accessing service module 408.

A "ranking dimension," as used herein, is a data entity (e.g., if stored in the database 116, a data object of type "ranking dimension") which specifies one or more object attributes that can (collectively) serve as a criterion for ranking data objects retrieved in response to a database-access request 520. Data objects may, for instance, be ranked based on the user with which they are associated, as reflected in an object attribute that identifies the user, such as a numerical identifier or user name. As another example, data objects may be ranked based on the recency of their creation or latest update, which may be reflected in a time stamp stored as an object attribute. Further example ranking dimensions include, without limitation, the status of a data object (e.g., active, archived), the status of an action or project (e.g., approved, pending, in progress, completed), a department or cost center associated with a data object, or a target date for release or shipment of a product, to name just a few. Data objects may even be ranked directly based on their keys, which is meaningful in situations where certain object keys to be boosted are determined dynamically based on criteria outside the scope of the object data (such as, e.g., click counters that quantify the frequency of user access to the objects). As will be apparent from these examples, some ranking dimensions (such as the object key) may be generally applicable to all object types (e.g., click counter), whereas others (e.g., sales order status) may apply to only a subset of one or more (but less than all) object types, depending on the types of object attributes available for different object types. To avoid replicating ranking dimensions that are applicable to multiple object types, the ranking dimensions 530 are stored, in accordance with various embodiments, separately from their assignment to the various object types.

A "ranking configuration," as used herein, is a data entity that assigns one or more ranking dimensions 530 to a given object type, and further lists values of the object attributes specified in the assigned ranking dimensions 530 that, if assumed by a data object of that type, are to affect the ranking, e.g., by "boosting" that data object to a higher rank (and thereby implicitly lowering one or more other data objects in rank). For a given set of (one or more) object attributes, multiple sets of (one or more respective) values may be specified, each set with an associated significance weight that quantifies how much the data object matching the specified set of values is to be boosted or lowered, as may be the case. (The terms "set of object attributes" and "set of values" herein encompass both single attributes and values as well as attribute and value tuples.) Furthermore, the ranking configuration may include, for each ranking dimension, an associated ranking-impact weight to define the relative impact of one ranking dimension versus another (if multiple ranking dimensions are assigned to an object type) as well as the relative impact of object-attribute-based ranking versus other kinds of possible ranking conditions (such as, e.g., ranking based on the occurrence of search terms in the data objects). In one example embodiment, a significance weight corresponding to a set of one or more values may be multiplied by the corresponding ranking-impact weight to derive a single compound weight for the set of one or more values, where the compound weight accounts for both the significance weight and the ranking-impact weight. For example, a significance weight of 0.6 for a set of one or more values and a ranking-impact weight of 0.8 for the corresponding ranking dimension would result in a compound weight of 0.48.

Since the ranking configurations 532 are generally object-type-specific, the collection of ranking dimensions 530 may include multiple individual ranking configurations 532, e.g., one for each type of data object 524 stored in the database 116, although object types may also be grouped for purposes of a ranking configuration if they all include the object attributes corresponding to the assigned ranking dimensions. Note, further, that a ranking configuration need not necessarily be specified for each existing object type; data objects of a type for which no configuration exists may simply not undergo any ranking adjustments or boosting.

In various embodiments, the ranking configurations may be, furthermore, specific to individual users or groups of users with similar data needs. Various user-specific ranking configurations may, for example, differ in the specified attribute values and/or the associated significance weights. In principle, it is also possible to allow data retrieved for different users to be ranked according to different dimensions and/or using different ranking-impact weights. In many circumstance, it will, however, be beneficial to assign dimensions and ranking-impact weights globally, and limit user-specific configurations to the attribute values and significance weights.

Ranking Based on Data of Continuous Scales

In one example embodiment, a parameter or attribute can be either discrete or continuous. A user identification attribute, for example, is discrete: it is either the session user or another user. A geographic location parameter may be a continuous parameter. For example, an area defined by a circumference around a target value may be considered by the search/ranking procedure, where the ranking value (ceteris paribus) declines with increasing radius. Hence, continuous parameters or attributes have to be defined as such.

There are a variety of options for defining continuous parameters and attributes. In one example embodiment, a real distance function to be applied by the search engine is defined. In one example embodiment, classes may be created that can be assigned significances (like "today," "yesterday," "this week," "this quarter," "this year," and the like). Building the classes can be done either in a static way, by listing the respective borders; or in a generic way, by defining (e.g., by specifying the width and ultimate border) how the classes can be built. The classes may be given identifiers, which in turn can be referred to in place of static values when assigning significances. Again, the actual value of the parameter at runtime enables the calculation of concrete interval boundaries from the scale definition. It is noted that a distance function may be a continuous function, or may have an inherent step of class-building on its scale. For example, the function may value documents created any time this week as one and value older documents as zero.

In one example embodiment, the ranking of data items using a continuous or quasi-continuous scale is frequently applicable to data such as date, time, and the like, and also to data such as prices, quantities, and the like. Here, the ranking refers to a target value. The target value may be static (e.g., Nov. 1, 2015 (ceteris paribus)) or dynamic (e.g., "the latest news ranks highest" (ceteris paribus)).

Formally, a distance function is defined that calculates the distance between the actual value and a (potentially dynamic) target value, and maps this to a ranking parameter and/or attribute. In one example embodiment, parameters or attributes of continuous scales can be transformed to discrete scales by defining classes thereon, as described above. In one example embodiment, the distance functions may be implemented using distance functions defined for fuzzy searches or as runtime implementations of fuzzy functions. The distance functions may be linear, logarithmic decreasing, and the like. These distance functions return a ranking value based on a target value. In this case, a rule set can be defined that enables the specification of fuzziness criteria for an attribute and/or parameter, including a minimum level, stop criteria, and the like. In one example embodiment, this can also be done for a combination of several attributes with relative weights assigned to each. In addition to being implemented by defining a fuzzy rule set, the distance function to be applied (and its corresponding parameters and/or attributes) can be implemented by defining and storing the configuration in a server-based application. In this case, the details of the distance function are specified in the WHERE-clause of a search query.

Conventionally, the rule set acts as a filter and reduces the size of the (number of items in the) search result set. In one example embodiment, the list of items in the search result set is not changed; only the ranking values of the items in the search result set are changed. This can be achieved by setting a fuzziness factor close to zero, allowing all values (which, in turn, could influence the resulting ranking value or, at its best, imply a performance penalty), or by an explicit setting that has the effect of switching off the result set manipulation (leaving only the ranking value influence).

In one example embodiment, a ranking configuration 532 is defined for an object type that specifies the relevant attributes and the target value to compare against. From this configuration, fuzzy rule sets are derived. The rule sets can be defined by generating atomic (i.e., referring to a single attribute) or complex (i.e., referring to several attributes) rule sets at design time or by dynamically defining rule sets, such as at runtime. Atomic rule sets allow the weighting of attributes to be implemented in a single layer only, together with all other factors that influence the ranking.

If the rule sets are generated at the time of configuring the ranking criteria, variable target values, such as "minimum," "maximum," "average," and the like are supported (without implying a restriction of the functionality to these functions). If the rule sets are generated at runtime, the dynamic value can sometimes be replaced by the actual values. For example, if "latest" is ranked as highest, then "latest" at runtime is the current time stamp. The object data with the most recent time stamp could be, however, relatively old. Comparing this rather old object data to the maximum target value yields misleadingly high ranking values, while comparing it to the current time stamp yields the correct, lower rank. For example, consider two sales orders: SO2015 from January of this year and SO2014 from February of last year. If "latest" refers to today, then SO2015 receives a small boost (since SO2015 is relatively old), and SO2014 gets no boost at all (assuming that only sales orders up to one year old are considered). If, however, "latest" refers to the maximum target value in the available data, then SO2015 receives a large boost since it is the most recent of the two sales orders; SO2014 receives a small boost (being almost a year away from the reference value defined by SO2015). In certain situations, this latter result may be less desirable; using dynamic information, such as by replacing a dynamic target date with the current time stamp, will provide the former results of this example. In one example embodiment, the rule sets are applied with a specified weight. For instance, a rule set may have a weight of 0.2 within the total ranking; then a resulting ranking value of 0.8 has to be weighted accordingly, resulting in a total contribution of 0.16.

At search runtime, the configuration is read and, in the case of SQL, the SELECT statement is enhanced based on the rule definitions that are to be applied (with their respective weights). This also applies analogously to any other method for accessing the data.

The search engine then evaluates the rule sets and calculates the resulting ranking values using the fuzzy mechanisms. This may be done for all kinds of technical ranking mechanisms (such as term frequency/inverse document frequency (TF/IDF), attribute weights, fuzzy weights, and the like) in an integrated way (where this usage for ranking seamlessly blends in). Example SELECT statements for ranking data of continuous scales are described below.

Ranking Based on Dynamic Contextual Information

In one example embodiment, the ranking of a search result is influenced by dynamic contextual information. The current location of a user, the application context the user is working in, or even the current outdoor temperature are examples of dynamic contextual information that can be used in ranking. For example, a search for clothing articles may return sandals and bathing articles as well as parkas and winter gloves. The rank of parkas and winter gloves can be boosted in a product result set when the current temperature is cold, and the rank of sandals and bathing articles can be boosted in a product result set when the current temperature is warm. Dynamic context-based ranking is distinguished from static context-based ranking by the determination of the contextual data values after the configuration of the contextual ranking criteria. As described above, the boosting may be implemented as one or more weighted WHERE-condition fragments and may be combined with other WHERE-condition fragments to rank the data items using a plurality of ranking criteria.

In one example embodiment, contextual parameters and attributes are defined during the configuration phase, i.e., during the definition of the ranking configuration(s) 532. In one example embodiment, the contextual parameters and attributes are stored in the ranking configuration(s) 532. Examples of contextual parameters and attributes include user or device latitude, user or device longitude, elevation, temperature, device identification, application, user identification, user language, time stamp, time of day, and the like. Additional contextual parameters and attributes may, for example, be defined at configuration time. An entire ranking dimension 530 may be defined as dynamic contextual, or a subset of the parameters and/or attributes of the ranking dimension 530 may be defined as dynamic contextual. Static and dynamic attributes may also be mixed in an attribute tuple that has a common significance value.

During the assignment of a parameter or an attribute of a ranking dimension 530, it can be specified whether the attribute acts as a static attribute (which may be the default behavior) or whether the parameter or attribute acts as a dynamic contextual parameter. During the execution of the ranking (i.e., during runtime), the value of the dynamic contextual attribute or parameter is mapped to the corresponding parameter or attribute in the WHERE-condition fragment such that the ranking is based on the current value of the parameter or attribute.

A dynamic contextual value may also be used to compute a significance weight for a parameter or attribute or to select a significance weight from a plurality of significance weights defined prior to runtime. Thus, for dynamic parameters and attributes, a specific value for the significance weight may not be determined prior to runtime; rather, the significance value is determined based on the dynamic value of the parameter or attribute. In this case, the dynamic significance weights are configured (but not selected or computed) during the configuration phase; the specific value of each significance weight is determined dynamically at runtime.

The source of the actual dynamic value of the parameter(s) and/or attribute(s) can be a server (for values such as user settings, date, time, and the like), a client device (for values such as device identification, application identification, location, user heart rate, and the like), and the like. Client-side values may include a variety of sensor data, such as user temperature, environmental temperature, and the like. While the values of, for example, a server may usually be evaluated by the context handler module 416, values from the client device 104 may be provided by the client device 104. For example, the value of the parameter(s) and/or attribute(s) may be provided by the client device 104 along with the search request. In the latter case, the handler for the search request may feed one or more of the values contained in the search request to the context handler module 416.

In one example embodiment, the database query engine 202 obtains the actual (dynamic) value(s) of the dynamic contextual parameter(s) and/or attribute(s) from the context handler module 416 at runtime and replaces the value of each dynamic contextual parameter and/or attribute by the actual value. For a given search scope, the assigned parameters and/or attributes are known from the ranking configuration 532, so that this request can be a specific one; that is, the request is only for the values of the specified parameter(s) and/or attribute(s). Based on the actual values, new significances are dynamically generated. Significance data corresponding to static attributes may also be read, as described above.

Figure 6:
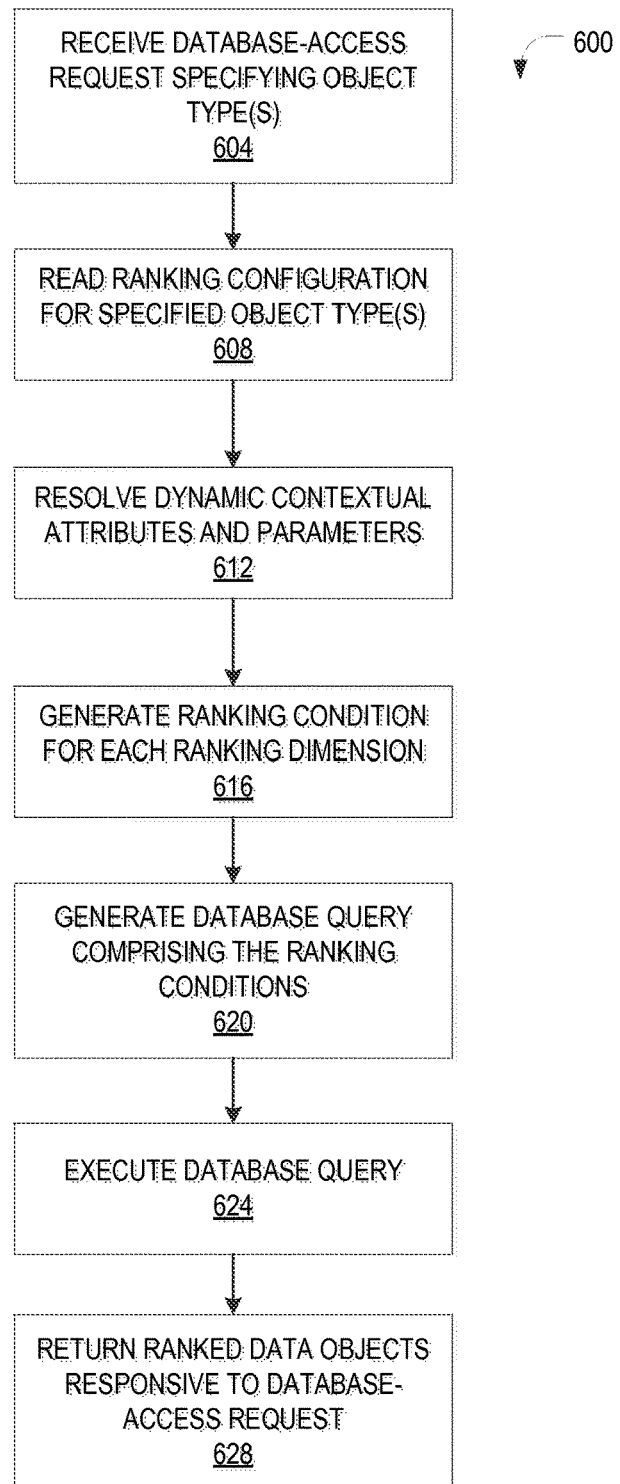
FIG. 6 is a flowchart of an example method, in accordance with one example embodiment, for ranking data items of continuous scales.

FIG. 6 is a flowchart of an example method 600, in accordance with one example embodiment, for ranking data items of continuous scales. In an example embodiment, one or more of the operations of the method 600 may be performed by the DBMS 200 and/or the apparatus 400.

As described above, a user may explicitly search for certain data by entering one or more search terms and/or other search criteria via a user interface provided by the user interface module 406. The search request may be received by the database-accessing service module 408, and the database-access request 520 may be generated. The database-access request 520 may also be automatically initiated via the database-accessing service module 408, e.g., to populate data fields in a user interface upon log-in of a user, or to retrieve data used to process a request for service from another application in a services-oriented architecture. In an example embodiment, the database-access request 520 specifying an object type and, optionally, one or more search terms, is obtained, for example, from the database-accessing service module 408 (operation 604).

Ranking configuration 532 data that corresponds to the specified object type and the associated ranking dimension(s) 530 are obtained from, for example, the database 116 (operation 608). As described above, the ranking configuration(s) 532 may be created manually, e.g., via the ranking-configuration console 512, or programmatically. The ranking configurations 532 may assign one or more ranking dimensions 530 to a given object type; may list values of the object attributes specified in the assigned ranking dimensions 530 that, if assumed by a data object of that type, are to result in a higher rank, or "boosting," of that data object; and may specify the significance weights for the sets of values that correspond to the object attributes. Furthermore, the ranking configurations 532 may include, for each ranking dimension 530, an associated ranking-impact weight.

In one example embodiment, contextual data is optionally obtained and used to resolve dynamic contextual parameters and/or attributes (operation 612). For example, the dynamic values for the dynamic parameters and attributes may be obtained from a server, a web site, a client device, and the like. The obtained dynamic values are then used to 1) select or compute significance value(s), if applicable; 2) derive the value of the contextual parameter(s) and/or attribute(s); and 3) determine if a WHERE-condition fragment is to be excluded or included in the database query 204.

Based on the search request, the ranking configuration 532 data, the optional user data 534, and the optional context data 536 and corresponding derived values (such as the selected or computed significance values), ranking conditions, such as WHERE-condition fragments, are generated for each ranking dimension (operation 616), and the database query 204, such as an SQL query, is generated by the query builder module 412 using the generated ranking conditions (operation 620). As described above, the database query 204 may specify, as the source of the data, one or more of the tables in the database 116, corresponding to one or more object types specified in the database-access request 520.

In accordance with some example embodiments, the generated database query 204 takes the form of a SELECT statement (a type of SQL statement used to retrieve data objects from a database), and the ranking conditions are included in the database query 204 as WHERE conditions. To illustrate, the general syntax of such a SELECT statement for a database-access request specifying a single object type is, in one example embodiment:
SELECT  FROM <object type> WHERE . . . , ORDER BY score DESC.

The database query 204 may then be executed (operation 624). For example, the database query 204 may be forwarded to the DBMS 200 for execution. As described above, the database query engine 202 may be, for example, a regular SQL engine, with inherent functionality not only for retrieving data objects in accordance with a SELECT statement, but also for ranking them in accordance with suitably formatted, weighted WHERE conditions. The ranking is thereby performed in conjunction with the database query 204 and the ranked results are returned by the database query engine 202 (operation 628).

The execution of the database query 204 involves retrieving, from the database 116, data objects responsive to the database-access request (e.g., in the context of a search request, relevant to the search terms), as well as ranking the responsive data objects in accordance with the ranking conditions. The database query engine 202 may include functionality for evaluating each of the WHERE conditions for each data object, computing an overall score for the data object based on the weights associated with the various conditions, and then ordering the data objects by that score (as reflected in the above SELECT statements by the phrase "ORDER BY score DESC").

In one example embodiment, a search command including one or more search terms (e.g., "current sales") can be submitted by a user. The search can be executed against, for example, a single business object type (e.g., products). The business object can be, for example, a database-view on one or more underlying tables in a database, such as associated with an application. Based on the search request, the ranking configuration 532 data, the optional user data 534, and the dynamic contextual data and corresponding derived values, a database query 204 can be constructed to create, for example, the SQL-like statement disclosed above:
SELECT <search-result> FROM products WHERE . . . , ORDER BY score DESC.

To make the search results more relevant to the user, ranking-impact weights can be assigned to attributes (e.g., columns of a database table). For example, attributes associated with the search can be assigned with a ranking weight, as described above, reflecting the relevance of the attribute (column) to the specified business object.

In a further example, it may be known that the user is assigned to the work area "Sales" (or is assigned to a sales-related group or role). Using this knowledge, relevance ranking can be used to boost the rank of sales-related products. For example, all products that are categorized in the area "Sales" can be boosted, e.g., as shown in the following pseudo SQL fragment:

. . . WHERE workArea="Sales".

In another example, the SQL statement can be modified to boost objects that the user has touched most frequently in the last week. For example, the following pseudo SQL fragment is applicable, in which the objectKey="4711" is used to indicate the previous week:

. . . WHERE objectKey="4711".

In one example embodiment, value boosting can be seamlessly integrated with the original ranking, so that a low score due to the first can be increased by the second and vice versa. A ranking-impact weight can be used to weight certain attributes higher than other attributes. For example, the two parameters described above may be weighted by 0.7 and 0.5, respectively:

. . . WHERE workArea="Sales" [Ranking-impact Weight=70%]

. . . WHERE objectKey="4711" [Ranking-impact Weight=50%].

In some example implementations, significance weights may also be added to the different values that an attribute within a given query condition can assume. For example, attribute values that are to result in boosting can have higher associated weights, and attribute values that are not to result in boosting (generally the complement to the set of values to cause boosting) can have lower associated weights. (The inclusion of the complement with a lower weight serves to avoid excluding the corresponding data objects altogether from the query results.) All of the weights, for example, can enable the value boosting itself, and further can be used to adjust impacts between the boost conditions. For example, the following pseudo SQL fragments can be used:

```
SELECT <search-result> FROM Products WHERE ... AND
    (workArea = "Sales" [weight = 0.7] OR workArea != "Sales"
    [weight = 0.1] )
AND
    (objectKey = "4711" [weight = 0.5] OR objectKey != "4711"
    [weight = 0.1] ).
```

Products in the work area "sales" are boosted with a weight of 0.7 and products in other areas are boosted with a smaller weight of 0.1. In the above example, a compound weight is used; the compound weight accounts for both the ranking-impact weight and the significance weight, as described more fully above.

The pseudo SQL shown above includes an out-condition:
   workArea !="Sales" [weight=0.1]
for including non-"sales" result entries in the search results but with a lower rank. The pseudo SQL thus includes the in-condition 'workArea="Sales" [weight=0.7]' for including sales result entries in the search results with a higher rank and an out-condition 'workArea !="Sales" [weight=0.1]' for including non-"sales" result entries in the search results but with the lower rank. To construct an out-condition, default low weights are typically used.

In some implementations, null values can be considered by the OUT condition too:
   (workArea="Sales" [weight=0.7] OR
   workArea !="Sales" [weight=0.1] OR
   workArea is NULL [weight=0.1]).

In another example, in a search for data objects of type "product," results that list a specified preferred vendor in the vendor attribute may receive a boost:

SELECT  FROM Products WHERE (
   vendor="PreferredVendor" [weight=0.8] OR
   vendor !="PreferredVendor" [weight=0.1]).

The WHERE condition is structured to specify a higher weight x (e.g., 0.8) if the attribute assumes the specified value (e.g., if the vendor attribute has the value Preferred-Vendor), and a generally much lower weighty (e.g., 0.1) if the attribute does not assume the specified value. As noted above, the inclusion of the complement serves to ensure that data objects otherwise responsive to the database-access request are not omitted from the results list simply because they do not meet the boosting condition, but are instead retained in the results list with merely a lower rank. Also, as noted above, the weights specified in the WHERE conditions may be compound weights computed as the product of the ranking-impact weight of the ranking dimension and the significance weight associated with the specified attribute value.

In one example embodiment, the ranking configuration 532 may specify multiple values that result in different levels of boosting. In this case, the WHERE condition may include multiple disjunctively linked sub-conditions of the general form:

```
WHERE (
    <attribute> = <value1> [weight = <x1>] OR
    <attribute> = <value2> [weight = <x2>] OR .... OR
    <attribute> != <value1> [weight = <y>] ).
```

Continuing the above example, two specified vendors may be preferred over all others, one slightly more than the other:

```
WHERE (
    vendor = "PreferredVendor1" [weight = 0.8] OR
    vendor = "PreferredVendor2" [weight = 0.7] OR
    vendor != "PreferredVendor" [weight = 0.1] ).
```

As will be appreciated, any number of attribute values and associated significance weights can in principle be specified in the ranking configuration.

A ranking dimension need not be limited to a single object attribute, but may specify a set including multiple object attributes (or an attribute tuple) that is used in combination to affect the ranking of object types:

```
WHERE (
    {<attribute1>, <attribute2>} = {<value1>, <value2>} [weight = x]
OR  {<attribute1>, <attribute2>} != {<value1>,<value2>} [weight = y]).
```

For example, in a search for persons (e.g., employees), the combination of first name and last name may be relevant to ranking:

```
SELECT  FROM Employees
    WHERE (
        {last_name, first_name} = {"Miller","Carl"} [weight = 0.9]
    OR  {last_name, first_name} != {"Miller","Carl"} [weight =
        0.1]).
```

As mentioned above, the ranking of data objects may be affected by multiple ranking dimensions with generally different ranking-impact weights (although, of course, the special case where the ranking impact weights assigned to two dimensions happen to be equal is not excluded). The query builder module 412 will generate a WHERE condition for each dimension, and then link the WHERE conditions conjunctively in the SELECT statement:

```
SELECT < results> FROM <object type>
    WHERE (
        <attribute1> = <value1> [weight = <x1>] OR
        <attribute1> != <value1> [weight = <y1>])
        AND
    WHERE (
        <attribute2> = <value2> [weight = <x2>] OR
        <attribute2> != <value2> [weight = <y2>])).
```

For example, when searching for development projects, ranking may be based on a combination of the development phase and the target completion date, with projects further along in the development process or closer to the target date being ranked higher:

```
SELECT < results> FROM Projects
    WHERE (
        phase = "testing" [weight = 0.9] OR
        phase = "implementation" [weight = 0.7] OR
        phase = "planning" [weight = 0.5] OR
        phase != ("testing" OR "implement" OR "planning")
            [weight = 0.1])
    AND WHERE (
        completion_target = "ThisQuarter" [weight = 0.5] OR
        completion_target = "NextQuarter" [weight 0.3] OR
        completion_target != ("ThisQuarter" OR "NextQuarter")
            [weight = 0.1]).
```

When ranking is affected by multiple ranking dimensions, the relative ranking impacts of these dimensions come into play. In the above example, for instance, ranking based on the development phase may have ranking-impact weight 1.0, while ranking based on the target completion date may have ranking-impact weight 0.5. The significance weights for the phase values "testing," "implementation," and "planning" may be 0.9, 0.7, and 0.5, respectively. The significance weights for target completion dates "ThisQuarter" and "NextQuarter" may have significance weights 1.0 and 0.6, respectively; in conjunction with the ranking-impact weight of 0.5, this results in overall weights of 0.5 and 0.3, respectively.

In the database query, ranking based on object data and ranking configurations as described above may be combined with other kinds of ranking conditions, for example with ranking based on relevancy to search terms supplied by a user. In this case, the relevancy to the search terms can be captured in a separate WHERE condition, which may have its own associated weight that determines the relative impact of search-based ranking and object-data-based ranking, and may, for example, take the form:

```
SELECT < results> FROM <object type> WHERE CONTAINS
(<attribute1> [weight= <y1>] <attribute2> [weight=<y2>], <search
terms>])AND
(<attribute> = <value1> [weight = <x>] OR <attribute> != <value1>
[weight = <y>]
), ORDER BY score DESC.
```

The weight associated with the relevancy to the search term(s) may be some metric of the fit between the search terms and the contents of the object data, and may be computed using, e.g., fuzzy search and/or term frequency/inverse document frequency (TF/IDF), or other relevancy-based concepts known to those of ordinary skill in the art. In one embodiment, data items that do not meet the criteria of a fuzzy rule set are excluded from the search result set.

In one example embodiment, the pseudo-syntax for a SELECT statement referring to data of continuous scales is defined as:

```
SELECT < results> FROM <object type>
    WHERE (
        <attribute1> = <today>
            distanceFunc=dateDistanceLinear(maxDistance=365,
            minScore=0.5)
        OR
        (<attribute1> != <today> [weight = 0]))
``` where maxDistance is the maximum allowed distance from a target date using a distance function "dateDistance." The calculation is based on a date scale and is computed in a linear way. In the above example, the function parameter "maxDistance" has the value 365 (i.e., one year). The minScore parameter determines the degree of fuzziness, meaning the distance in this case, to which the function is evaluated (which is equivalent to the resulting ranking value for the last item considered in the calculation).

In another example for data of continuous scales, the pseudo-syntax for the SELECT statement is defined as:

```
SELECT < results> FROM <object type>
    WHERE (
        <attribute1> = <latitude, longitude>
            distanceFunc=locDistanceLinear(maxDistance=500,
            minScore=0.6)
        OR
        (<attribute1> != < latitude, longitude> [weight = 0]))
``` where maxDistance is the maximum allowed distance from a target location (defined by latitude and longitude) using a distance function "locDistance." The calculation is based on a kilometer scale and is computed in a linear way. In the above example, the function parameter "maxDistance" has the value 500 (i.e., 500 kilometers). The minScore parameter determines the degree of fuzziness, meaning the distance in this case, to which the function is evaluated (which is equivalent to the resulting ranking value for the last item considered in the calculation). In one example embodiment, the SELECT fragment distanceFunc=locDistanceLinear(maxDistance=500, minScore=0.6)

is implemented using the SQL fragment: fuzzy(0.6, maxDateDistance=500).

When the ranking is to be influenced by dynamic information, dynamic contextual parameters and/attributes may be utilized. In one example, the current outdoor temperature associated with a user is a dynamic contextual parameter and may be utilized to boost the ranking of clothing articles based on the outdoor temperature. For example, the ranking of gloves may be boosted during colder temperatures and the ranking of sandals may be boosted during warmer temperatures (where temperatures are in degrees Celsius):

(clothing="gloves" [weight=0.2] AND "temperature">10 OR
clothing="gloves" [weight=0.8] AND "temperature"<10 OR
clothing !="gloves" [weight=0.1] OR
clothing="sandals" [weight=0.8] AND "temperature">20 OR
clothing="sandals" [weight=0.2] AND "temperature"<20 OR
clothing !="sandals" [weight=0.1]).

In one example embodiment, the dynamic contextual parameter is resolved by the context handler module 416. The parameter (i.e., temperature) acts as a constraint. At runtime, the temperature is obtained from a context data source. The constraint is evaluated based on the obtained context value (i.e., current temperature). If the temperature is, for example, 25 degrees Celsius, then the second and fifth tuples are not relevant; the remaining tuples are relevant and are reduced, removing the temperature fragment and leaving the boost for clothing:

(clothing="gloves" [weight=0.2] OR
clothing !="gloves" [weight=0.1] OR
clothing="sandals" [weight=0.8] OR
clothing !="sandals" [weight=0.1]).

The above fragments are then forwarded to the query builder module 412 for the generation of the ranking conditions. It is noted that the technique described above may be generally utilized by a ranking algorithm to reduce attribute tuples based on dynamic contextual information (independent of, for example, the use of SQL to access a database). For example, the full search result set can be accessed by a ranking algorithm and the technique described above may be utilized to rank the items in the result set. It is also noted that the context handler module 416 may be implemented in the apparatus 400, as described above, or may be implemented as an application on a server, such as on the servers 112 or 178 of FIGS. 1A and 1B.

In one example, the assignment of a user to a work area, as described above, is defined as a dynamic contextual attribute and may be utilized to boost the ranking of sales-related or service-related products, depending on the work area that the user is currently assigned to:

SELECT <search-result> FROM Products WHERE . . . AND
  (workArea="User Area" [weight=0.7] OR
  workArea !="User Area" [weight=0.1]) OR
  workArea is NULL [weight=0.1]).

In this example, the value of "User Area" (e.g., "Sales" or "Service") indicates the area to which the user is currently assigned, and is obtained at runtime. The value is then substituted for "User Area" in the SELECT statement. For example, if the user is currently assigned to the "Sales" work area, the SELECT statement is:

SELECT <search-result> FROM Products WHERE . . . AND
  (workArea="Sales" [weight=0.7] OR
  workArea !="Sales" [weight=0.1]) OR
  workArea is NULL [weight=0.1]).

If the user is currently assigned to the "Service" work area, the SELECT statement is:

SELECT <search-result> FROM Products WHERE . . . AND
  (workArea="Service" [weight=0.7] OR
  workArea !="Service" [weight=0.1]) OR
  workArea is NULL [weight=0.1]).

As described above, the dynamic contextual attribute may be resolved by the context handler module 416 and the resolved fragments then forwarded to the query builder module 412 for the generation of the ranking conditions.

In one example embodiment, the inclusion or exclusion of a WHERE condition (e.g., a WHERE-condition fragment) may be based on a dynamic contextual value. For example, if an attribute, such as a car's engine type, is gas, then a specified WHERE-condition fragment related to miles per gallon is included in the database query 204. If the car's engine is electric, then the WHERE-condition fragment related to miles per gallon is excluded from the database query 204. In this case, the dynamic attribute acts as a constraint.

Engine=gas:
  (MPG>25 [weight=0.9] AND cost<20,000 [weight=0.9] OR
  MPG<25 [weight=0.4] AND cost<20,000 [weight=0.9] OR
  MPG>25 [weight=0.9] AND cost>20,000 [weight=0.6] OR
  MPG<25 [weight=0.4] AND cost>20,000 [weight=0.6])

Engine=electric:
  (cost<20,000 [weight=0.9] OR
  cost>20,000 [weight=0.6]).

In another example of a constraint, assume that boosting based on supplier identification is desired, dependent on a user's purchasing group. The user's assigned purchasing group may be obtained, for example, from a data source (that may be different from the database 116). In this case, a ranking dimension with a parameter and an attribute is defined: PurchGroup and SupplierID. The parameter, PurchGroup, acts as a constraint. The attribute, SupplierID, is bound against the supplier table's respective identifier column. For the significance data, two tuples are maintained: {(PurchGroup=G1, SupplierID=123), Boost=0.9}, {(PurchGroup=G2, SupplierID=789), Boost=0.9}. At runtime, the value of the purchasing group that the user is assigned to (e.g., G2) is obtained from the context data source. The constraint is evaluated based on the obtained context value. In this case, the result is that the first tuple is not relevant since the context value is not G1; the second tuple is relevant since the context value is G2. The first tuple is eliminated and the remaining tuple is reduced, removing the PurchGroup fragment and leaving only the boost for SupplierID=789.

Using weighting as described above, the search result is not modified in the number of items, but in the order (e.g., ranking) of items. Additionally, this weighting can naturally integrate with other types of ranking (e.g., an original ranking), because the weights can be internally balanced against the weights of the freestyle-columns used in the original ranking Thus, using weights in query conditions provides for query extensions that not only retain the result set unchanged in number, but also change the ranking of items in the search result, e.g., by boosting result entries having desired values in feature-value pairs (e.g., attributes of a database table).

Figure 7:
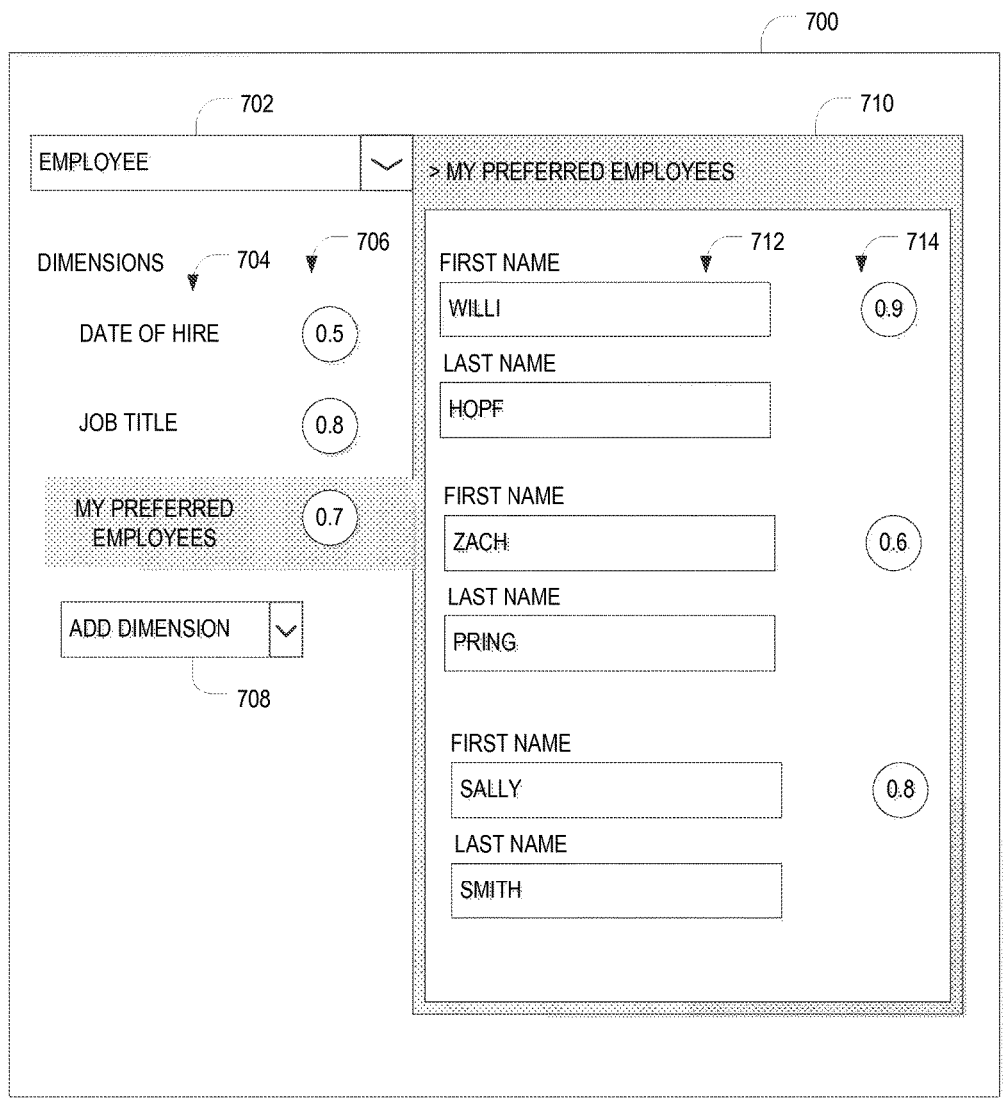
FIG. 7 is an example user interface diagram illustrating a ranking-configuration console, in accordance with one example embodiment.

FIG. 7 is an example user interface 700 diagram illustrating a ranking-configuration console 512, in accordance with an example embodiment. The user interface 700 may include a drop-down menu 702 for selecting an object type for which the ranking configuration is to be specified. In the example, the selected object type is "Employee." Below the selected object type, ranking dimensions 704 already assigned to that object type are listed, along with specified ranking-impact weights 706. In the example illustrated, employees will be ranked, in order of decreasing impact, based on their job titles, a list of named preferred employees, and their dates of hire. The user may add further ranking dimensions via a dimension drop-down menu 708. Upon selection of a particular one of the assigned dimensions, as shown for the dimension "My Preferred Employees," a dialog 710 allows the user to specify, e.g., via text input fields 712 (or, alternatively, drop-down selections), the object attribute values that are to result in boosting of a data object. For example, preferred employees may be specified in terms of the combination of their first and last names. Next to the sets of attribute values, the associated significance weights 714 can be specified. As will be readily appreciated, the illustrated user interface 700 is merely one example for implementing a ranking-configuration console 512 that allows manual specification of ranking dimensions. Alternative user interfaces may differ, e.g., in the types and arrangements of user-interface elements or the sequence of screens or windows that appear to guide the user through the configuration process.

FIGS. 8A and 8B illustrate example unranked query results 812 and example ranked query results 862, in accordance with an example embodiment. The ranked query results 862 in FIG. 8B contain the same data items as the unranked query results 812 in FIG. 8A, except that the order of items in the ranked query results 862 is different from that of items in the unranked query results 812. For example, the unranked query results 812 provide one example order of the search results, e.g., if the search query is executed without weights assigned for feature-value pairs. The difference in order between the ranked query results 862 and the unranked query results 812 is caused by the weights in the weighted search query, which causes data items where WorkArea="Sales" and ObjectID="217, 317" to be ranked higher. For example, the first six query results appear at the top of the query results 862, as columns 818 and 820 are effectively weighted, forcing the corresponding query results to appear first. Values of columns 814, 816, 822, and 824 do not affect the ranking in this example.

Figure 9:
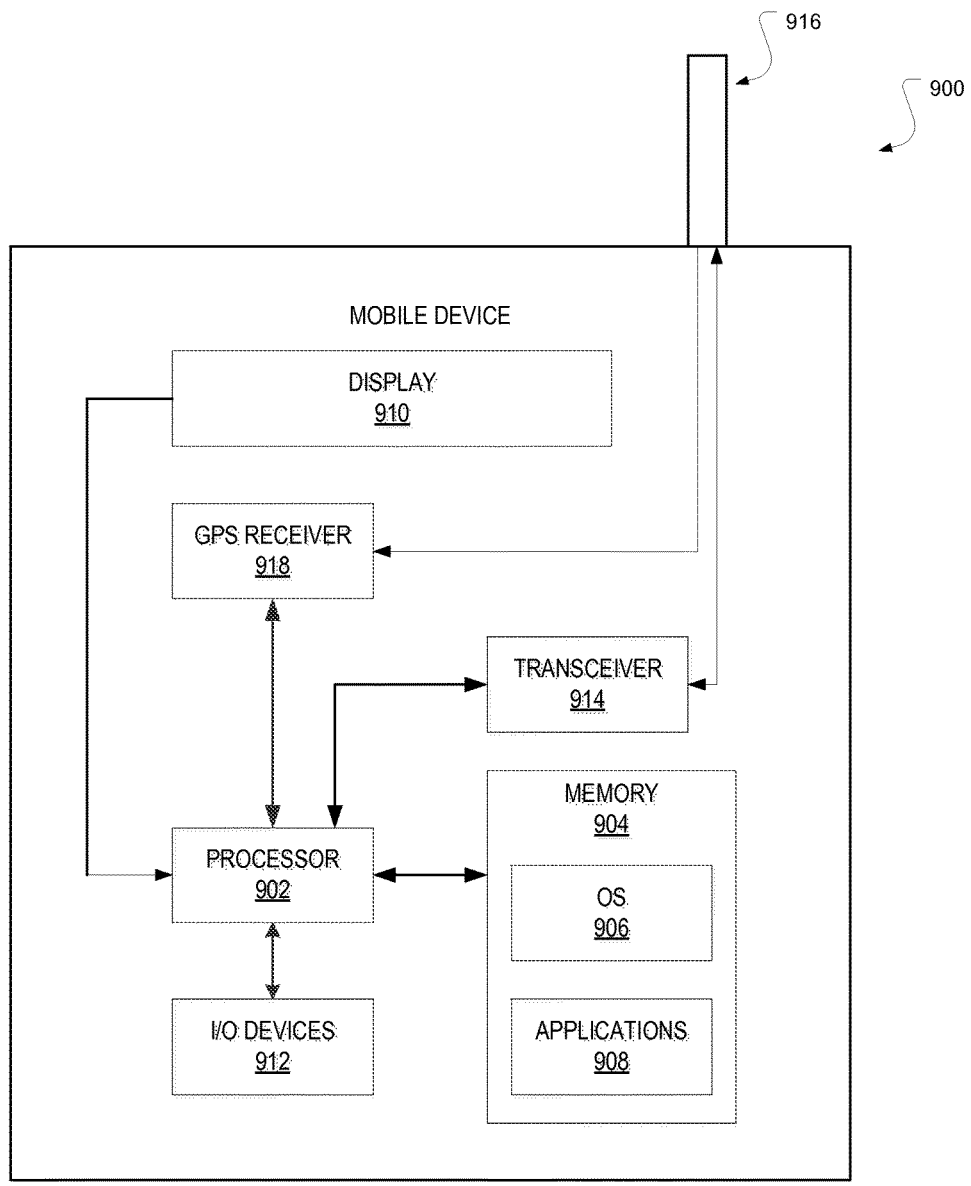
FIG. 9 is a block diagram illustrating a mobile device, according to an example embodiment.

FIG. 9 is a block diagram illustrating a mobile device 900, according to an example embodiment. The mobile device 900 can include a processor 902. The processor 902 can be any of a variety of different types of commercially available processors suitable for mobile devices 900 (for example, an XScale architecture microprocessor, a Microprocessor without Interlocked Pipeline Stages (MIPS) architecture processor, or another type of processor). A memory 904, such as a random access memory (RAM), a flash memory, or another type of memory, is typically accessible to the processor 902. The memory 904 can be adapted to store an operating system (OS) 906, as well as applications 908, such as a mobile location enabled application that can provide location-based services (LBSs) to a user. The processor 902 can be coupled, either directly or via appropriate intermediary hardware, to a display 910 and to one or more input/output (I/O) devices 912, such as a keypad, a touch panel sensor, and a microphone. Similarly, in some embodiments, the processor 902 can be coupled to a transceiver 914 that interfaces with an antenna 916. The transceiver 914 can be configured to both transmit and receive cellular network signals, wireless data signals, or other types of signals via the antenna 916, depending on the nature of the mobile device 900. Further, in some configurations, a GPS receiver 918 can also make use of the antenna 916 to receive GPS signals.

Figure 10:
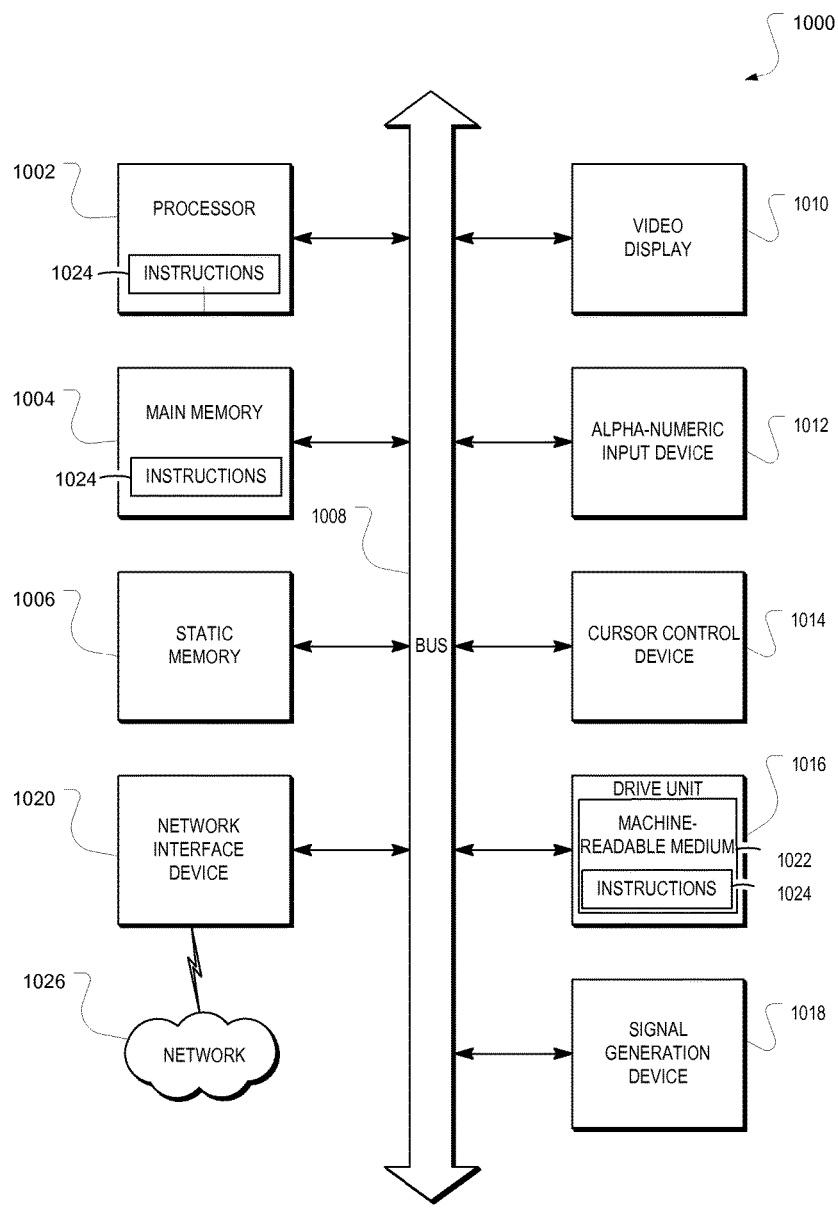
FIG. 10 is a block diagram of a computer processing system within which a set of instructions may be executed for causing a computer processing system to perform any one or more of the methodologies discussed herein.

FIG. 10 is a block diagram of a computer processing system 1000 within which a set of instructions 1024 may be executed for causing a computer to perform any one or more of the methodologies discussed herein. In some embodiments, the computer operates as a standalone device or may be connected (e.g., networked) to other computers. In a networked deployment, the computer may operate in the capacity of a server or a client computer in server-client network environment, or as a peer computer in a peer-to-peer (or distributed) network environment.

In addition to being sold or licensed via traditional channels, embodiments may also, for example, be deployed by software-as-a-service (SaaS), application service providers (ASPs), or by utility computing providers. The computer may be a server computer, a personal computer (PC), a tablet PC, a personal digital assistant (PDA), a cellular telephone, or any processing device capable of executing a set of instructions (sequential or otherwise) that specify actions to be taken by that device. Further, while only a single computer is illustrated, the term "computer" shall also be taken to include any collection of computers that, individually or jointly, execute a set (or multiple sets) of instructions to perform any one or more of the methodologies discussed herein.

The example computer processing system 1000 includes a processor 1002 (e.g., a central processing unit (CPU), a graphics processing unit (GPU), or both), a main memory 1004, and a static memory 1006, which communicate with each other via a bus 1008. The computer processing system 1000 may further include a video display 1010 (e.g., a plasma display, a liquid crystal display (LCD), or a cathode ray tube (CRT)). The computer processing system 1000 also includes an alphanumeric input device 1012 (e.g., a keyboard), a user interface (UI) navigation or cursor control device 1014 (e.g., a mouse and/or touch screen), a drive unit 1016, a signal generation device 1018 (e.g., a speaker), and a network interface device 1020.

The drive unit 1016 includes a machine-readable medium 1022 on which is stored one or more sets of instructions 1024 and data structures embodying or utilized by any one or more of the methodologies or functions described herein. The instructions 1024 may also reside, completely or at least partially, within the main memory 1004, the static memory 1006, and/or the processor 1002 during execution thereof by the computer processing system 1000, the main memory 1004, the static memory 1006, and the processor 1002 also constituting tangible machine-readable media 1022.

The instructions 1024 may further be transmitted or received over a network 1026 via the network interface device 1020 utilizing any one of a number of well-known transfer protocols (e.g., HTTP).

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions 1024. The term "machine-readable medium" shall also be taken to include any medium that is capable of storing, encoding, or carrying a set of instructions 1024 for execution by the computer and that cause the computer to perform any one or more of the methodologies of the present application, or that is capable of storing, encoding, or carrying data structures utilized by or associated with such a set of instructions 1024. The term "machine-readable medium" shall accordingly be taken to include, but not be limited to, solid-state memories and optical and magnetic media.

While the embodiments of the invention(s) is (are) described with reference to various implementations and exploitations, it will be understood that these embodiments are illustrative and that the scope of the invention(s) is not limited to them. In general, techniques for maintaining consistency between data structures may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

What is claimed is:

1. A method for ranking data objects, the method comprising:
    storing, in one or more computer-readable media:
        one or more ranking dimensions each comprising one or more object attributes and a ranking-impact weight, at least one of the object attributes being a continuous-scales object attribute; and
        a ranking configuration for an object type, the ranking configuration comprising an assignment of one or more of the ranking dimensions to the object type and, for each of the one or more assigned ranking dimensions, one or more corresponding values and a significance weight assigned to each value; and
    by at least one processor, in response to a database-access request specifying one of the object types:
        reading the ranking configuration for the specified object type;
        generating a ranking condition for each of the ranking dimensions assigned to the object type based at least in part on the one or more object attributes, the ranking-impact weight, and the one or more values and associated significance weights, at least one of the ranking conditions being based on a distance function, the distance function corresponding to the continuous-scales object attribute;
        generating a database query for data objects of the specified object type, the database query comprising the generated ranking condition;
        executing the database query at a database to retrieve a set of data objects of the specified object type; and
        ranking the set of data objects based at least in part on the generated ranking condition.

2. The method of claim 1, wherein the significance weights are associated with the one or more assigned ranking dimensions, and wherein the significance weights are associated with the ranking-impact weight of at least one of the assigned ranking dimensions.

3. The method of claim 1, wherein the ranking configuration is for a plurality of object types.

4. The method of claim 1, wherein the one or more object attributes form an attribute tuple of the ranking dimension.

5. The method of claim 1, wherein the one or more object attributes comprise a location of a user, a temperature, a heart rate, a latitude, a longitude, an elevation, a user-setting, a price, a quantity, a time stamp, a date, or a time.

6. The method of claim 1, wherein the database-access request comprises one or more search conditions.

7. The method of claim 1, further comprising specifying fuzziness criteria for the continuous-scales object attribute.

8. The method of claim 7, wherein the fuzziness criteria comprise one or more of a minimum level, a maximum level, a range, and a stop criteria.

9. The method of claim 7, wherein the fuzziness criteria are defined by a rule that defines one object attribute of the one or more object attributes.

10. The method of claim 7, wherein the fuzziness criteria are defined by a rule that defines a plurality of object attributes of the one or more object attributes.

11. The method of claim 7, wherein the fuzziness criteria are applied with a defined weight.

12. The method of claim 7, wherein the fuzziness criteria are defined during a configuration phase and comprise a variable target value.

13. The method of claim 12, wherein the variable target value is a minimum value, a maximum value, a value range, or an average value.

14. The method of claim 7, wherein the fuzziness criteria are defined during a runtime phase and define a specific target value.

15. An apparatus for ranking data objects, the apparatus comprising:
    one or more hardware processors;
    memory to store instructions that, when executed by the one or more hardware processors, perform operations comprising:
        storing, in one or more computer-readable media:
            one or more ranking dimensions each comprising one or more object attributes and a ranking-impact weight, at least one of the object attributes being a continuous-scales object attribute; and
            a ranking configuration for an object type, the ranking configuration comprising an assignment of one or more of the ranking dimensions to the object type and, for each of the one or more assigned ranking dimensions, one or more corresponding values and a significance weight assigned to each value; and
        in response to a database-access request specifying one of the object types:
            reading the ranking configuration for the specified object type;
            generating a ranking condition for each of the ranking dimensions assigned to the object type based at least in part on the one or more object attributes, the ranking-impact weight, and the one or more values and associated significance weights, at least one of the ranking conditions being based on a distance function, the distance function corresponding to the continuous-scales object attribute;
            generating a database query for data objects of the specified object type, the database query comprising the generated ranking condition;
            executing the database query at a database to retrieve a set of data objects of the specified object type; and
            ranking the set of data objects based at least in part on the generated ranking condition.

16. The apparatus of claim 15, wherein the significance weights associated with the one or more assigned ranking dimensions, and wherein the significance weights are associated with the ranking-impact weight of at least one of the assigned ranking dimensions.

17. The apparatus of claim 15, wherein the operations further comprise specifying fuzziness criteria for the continuous-scales object attribute.

18. The apparatus of claim 17, wherein the fuzziness criteria are applied with a defined weight.

19. A computer-readable medium embodying instructions that, when executed by a processor, perform operations comprising:

storing, in one or more computer-readable media:
- one or more ranking dimensions each comprising one or more object attributes and a ranking-impact weight, at least one of the object attributes being a continuous-scales object attribute; and
- a ranking configuration for an object type, the ranking configuration comprising an assignment of one or more of the ranking dimensions to the object type and, for each of the one or more assigned ranking dimensions, one or more corresponding values and a significance weight assigned to each value; and in response to a database-access request specifying one of the object types:
- reading the ranking configuration for the specified object type;
- generating a ranking condition for each of the ranking dimensions assigned to the object type based at least in part on the one or more object attributes, the ranking-impact weight, and the one or more values and associated significance weights, at least one of the ranking conditions being based on a distance function, the distance function corresponding to the continuous-scales object attribute;
- generating a database query for data objects of the specified object type, the database query comprising the generated ranking condition;
- executing the database query at a database to retrieve a set of data objects of the specified object type; and
- ranking the set of data objects based at least in part on the generated ranking condition.

* * * * *